(12) United States Patent
Gadringer et al.

(10) Patent No.: US 11,561,298 B2
(45) Date of Patent: Jan. 24, 2023

(54) DEVICE AND METHOD FOR CONVERTING A RADAR SIGNAL, AND TEST BENCH

(71) Applicant: AVL LIST GMBH, Graz (AT)

(72) Inventors: Michael Ernst Gadringer, Graz (AT); Michael Vorderderfler, Graz (AT); Andreas Gruber, Graz (AT); Helmut Schreiber, Graz (AT)

(73) Assignee: AVL List GmbH, Graz (AT)

( * ) Notice: Subject to any disclaimer, the term of this patent is extended or adjusted under 35 U.S.C. 154(b) by 299 days.

(21) Appl. No.: 16/753,866

(22) PCT Filed: Oct. 8, 2018

(86) PCT No.: PCT/AT2018/060236
§ 371 (c)(1),
(2) Date: Oct. 5, 2020

(87) PCT Pub. No.: WO2019/068125
PCT Pub. Date: Apr. 11, 2019

(65) Prior Publication Data
US 2021/0072366 A1 Mar. 11, 2021

(30) Foreign Application Priority Data
Oct. 6, 2017 (AT) ............... A 50857/2017

(51) Int. Cl.
*G01S 13/02* (2006.01)
*G01S 7/40* (2006.01)
*G01S 13/931* (2020.01)

(52) U.S. Cl.
CPC ........ *G01S 13/0209* (2013.01); *G01S 7/4004* (2013.01); *G01S 7/4052* (2013.01); *G01S 13/931* (2013.01); *G01S 2013/9327* (2020.01)

(58) Field of Classification Search
CPC .. G01S 13/0209; G01S 7/4004; G01S 7/4052; G01S 13/931; G01S 2013/9327
See application file for complete search history.

(56) References Cited

U.S. PATENT DOCUMENTS

| | | | |
|---|---|---|---|
| 3,002,188 A | 9/1961 | Abbott et al. | |
| 3,903,521 A * | 9/1975 | Jensen | G01S 7/40 342/171 |

(Continued)

FOREIGN PATENT DOCUMENTS

| | | |
|---|---|---|
| CN | 103809163 | 5/2014 |
| CN | 104391283 | 3/2015 |

(Continued)

OTHER PUBLICATIONS

Duan et al. "Finite-time Boundedness and I1-gain Analysis for Discrete Positive Switched Systems with Time-varying Delay," Proceedings of the 32nd Chinese Control Conference, Jul. 26-28, 2013, Xi'an, China, pp. 2090-2095.

(Continued)

*Primary Examiner* — Peter M Bythrow
*Assistant Examiner* — Nazra Nur Waheed
(74) *Attorney, Agent, or Firm* — Sheridan Ross P.C.

(57) ABSTRACT

The present invention relates to an apparatus and a method for converting a radar signal for further signal processing in a test bench with a radar target emulator as well as a test bench having such an apparatus. A divider assembly preferably comprises a divider device configured to reduce a frequency and a bandwidth of the radar signal by a first factor for the further signal processing. A multiplier assembly preferably comprises a multiplier device configured to increase a frequency and a bandwidth of the radar signal by the first factor subsequent the further signal processing.

9 Claims, 1 Drawing Sheet

(56) References Cited

U.S. PATENT DOCUMENTS

Figure 1:
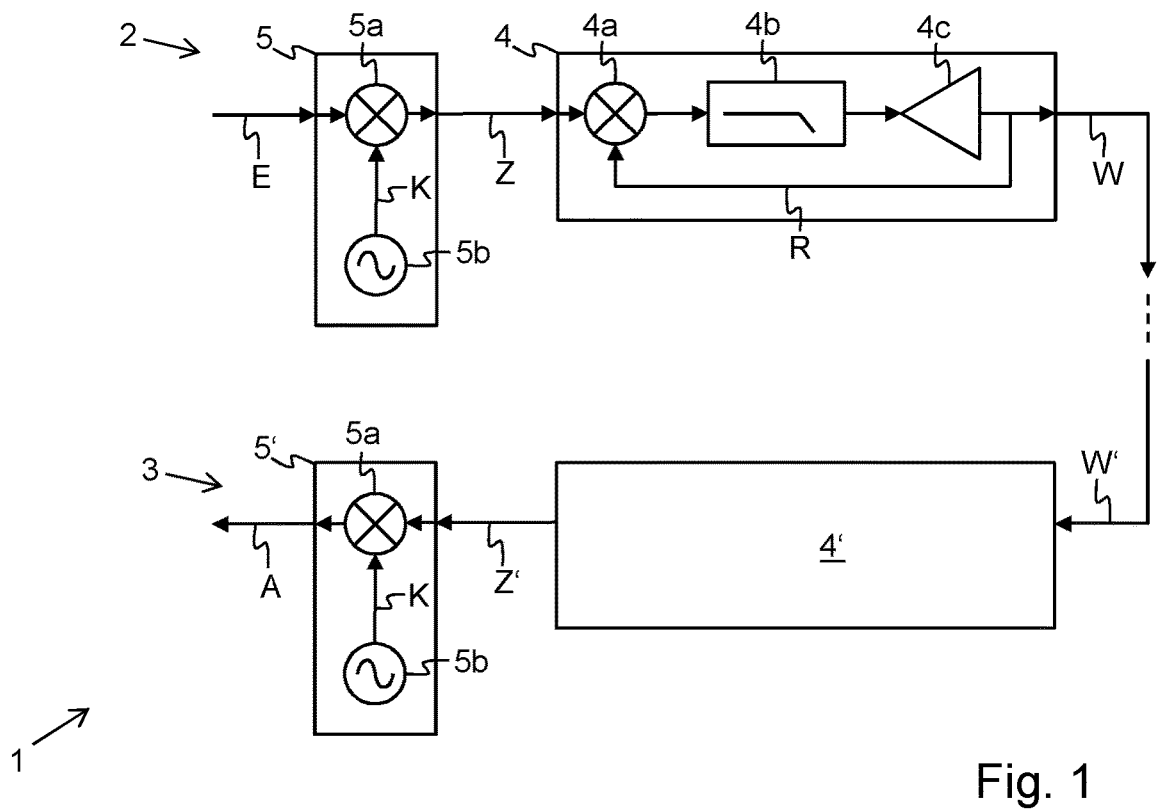

| | | | |
|---|---|---|---|
| 4,316,159 | A | 2/1982 | Ho |
| 4,660,041 | A | 4/1987 | Maples et al. |
| 5,247,843 | A | 9/1993 | Bryan |
| 5,339,087 | A | 8/1994 | Minarik |
| 5,518,400 | A | 5/1996 | Otiode et al. |
| 5,862,455 | A | 1/1999 | Martin et al. |
| 5,892,479 | A | 4/1999 | Mills et al. |
| 6,191,735 | B1 | 2/2001 | Schineller |
| 6,346,909 | B1 | 2/2002 | Johnson et al. |
| 6,624,780 | B1 | 9/2003 | Fouts et al. |
| 6,989,788 | B2 | 1/2006 | Marion et al. |
| 8,248,297 | B1 | 8/2012 | Baker et al. |
| 2003/0222693 | A1 | 12/2003 | Cohen et al. |
| 2004/0012517 | A1* | 1/2004 | Abou-Jaoude ........ G01S 7/4052 342/171 |
| 2004/0201518 | A1 | 10/2004 | Pace et al. |
| 2007/0285315 | A1 | 12/2007 | Davis et al. |
| 2009/0309783 | A1* | 12/2009 | Shih ...................... G01S 7/4052 342/172 |
| 2010/0109940 | A1 | 5/2010 | Williams |
| 2014/0197983 | A1* | 7/2014 | Reuter .................. G01S 13/347 342/175 |
| 2015/0350223 | A1 | 12/2015 | Spivack |
| 2016/0245900 | A1 | 8/2016 | Hurtarte et al. |
| 2017/0115378 | A1 | 4/2017 | Haghighi et al. |
| 2017/0132334 | A1 | 5/2017 | Levinson et al. |
| 2017/0307732 | A1 | 10/2017 | Haghighi et al. |
| 2018/0019755 | A1* | 1/2018 | Josefsberg .............. H03L 7/113 |
| 2019/0391234 | A1 | 12/2019 | Gruber et al. |
| 2020/0025875 | A1 | 1/2020 | Maier |

FOREIGN PATENT DOCUMENTS

| | | |
|---|---|---|
| CN | 105510980 | 4/2016 |
| CN | 106802593 | 6/2017 |
| DE | 2523288 | 12/1976 |
| DE | 3888993 | 10/1994 |
| DE | 69221121 | 3/1998 |
| DE | 102007002370 | 7/2008 |
| DE | 112012004728 | 7/2014 |
| DE | 102014017831 | 6/2016 |
| DE | 102014118622 | 6/2016 |
| DE | 102014118625 | 6/2016 |
| DE | 102015121297 | 3/2017 |
| EP | 0061559 | 10/1982 |
| EP | 1341000 | 9/2003 |
| GB | 2444161 | 5/2008 |
| JP | S60-223303 | 11/1985 |
| JP | H04-212083 | 8/1992 |
| JP | H07-280924 | 10/1995 |
| JP | H09-230029 | 9/1997 |
| JP | H09-270772 | 10/1997 |
| JP | H10-221429 | 8/1998 |
| JP | 2001-524676 | 12/2001 |
| JP | 2003-149324 | 5/2003 |
| JP | 3928837 | 6/2007 |
| JP | 2010-159998 | 7/2010 |
| KR | 10-2016-0050121 | 5/2016 |
| WO | WO 99/08129 | 2/1999 |
| WO | WO 2011/008146 | 1/2011 |
| WO | WO 2016/025683 | 2/2016 |

OTHER PUBLICATIONS

Vorderderfler et al. "Frequency dividers in radar target stimulator applications," Elektrotechnik & Informationstechnik, 2018, vol. 135, No. 4-5, pp. 344-351.

International Search Report and Written Opinion for International (PCT) Patent Application No. PCT/AT2018/060236, dated Jan. 4, 2019, 13 pages.

Translation of the International Search Report for International (PCT) Patent Application No. PCT/AT2018/060236, dated Jan. 4, 2019, 3 pages.

U.S. Appl. No. 16/474,799, filed Jun. 28, 2019, Gruber et al.

U.S. Appl. No. 16/753,848, filed Apr. 6, 2020, Gruber et al.

McMillian et al. "A 500 MHz GaAs digital RF memory modulator IC," Gallium Arsenide Integrated Circuit (GAAS IC) Symposium, 1996, Technic AL Digest 1996, 18th Annual Orlando, Fl. USA, Nov. 3-6, 1996, IEEE, pp. 73-76.

Mukti et al. "A preliminary result on development of analog broadband tapped delay line for L-band applications," International Seminar on Intelligent Technology and Its Applications (ISITIA), Lombok, Indonesia, Jul. 2016, pp. 357-362 (Abstract only).

Official Action with machine translation for European Patent Application No. 18786660.3, dated Dec. 9, 2021, 6 pages.

"Potentiometer," Wikipedia, 2022 retrieved from https://en.wikipedia.org/w/index/.php?title=Potenionmeter&oldid=1073049969, 10 pages.

\* cited by examiner

DEVICE AND METHOD FOR CONVERTING A RADAR SIGNAL, AND TEST BENCH

CROSS REFERENCE TO RELATED APPLICATIONS

This application is a national stage application under 35 U.S.C. 371 and claims the benefit of PCT Application No. PCT/AT2018/060236 having an international filing date of 8 Oct. 2018, which designated the United States, which PCT application claimed the benefit of Austria Patent Application No. A50857/2017 filed 6 Oct. 2017, the disclosures of each of which are incorporated herein by reference in their entireties.

The present invention relates to an apparatus and a method for converting a radar signal for further signal processing in a test bench with a radar target emulator as well as a test bench having such an apparatus.

The complexity of mobile systems, especially of land-based motor vehicles, such as passenger cars, trucks or motorcycles, has been continuously increasing for years. In addition to reducing emissions and/or fuel consumption or increasing driving comfort, this also entails, among other things, coping with the steadily increasing volume of traffic, especially in urban centers. This is generally the purview of driver assistance systems or assistance systems respectively, these using information about the vehicle's surroundings, in particular the anticipated route, via vehicle-internal sensors and/or via communication with other vehicles and/or stationary points/services to support the driver in standard driving situations and/or extreme situations by way of notifications and/or to actively intervene in the vehicle's behavior.

Radar sensors, which monitor the immediate surroundings of the vehicle with regard to obstacles and/or vehicles driving in front or the like, are frequently used, at least as a component of the above-cited sensor system. Known for the purpose of evaluating an assistance system is furnishing same with information by way of a test scenario, in particular a virtual test scenario, and evaluating the response of the assistance system.

In order to be able to process a radar signal of the radar sensor, potentially of high frequency, with regard to the test scenario, it is usually necessary to convert the frequency of the signal to a lower frequency range ("downconversion"), which is achieved for example by mixing the signal in a mixer stage using a local oscillator:

Document U.S. Pat. No. 8,248,297 B1 relates to a system for arrangement between a radar transmitter of a radar environment simulator and a radar receiver coupled to a radar target display. The system comprises a power divider for dividing an input radar signal, a local oscillator and two mixers, each being arranged in a respective signal component path from the power divider.

Document U.S. Pat. No. 3,903,521 relates to an apparatus for generating a test signal, wherein two input signals are received and synchronized for a radar system. When a signal is processed at a typical 8280 cycles per second in an acceleration sawtooth generator, a frequency divider of the acceleration sawtooth generator divides the cycles by a factor of two. This signal is limited during further processing and supplied to a frequency converter, the function of which is to translate the frequency of the signal into a frequency range which corresponds to the frequency range at a point of input of typical radar systems.

Document CN 105 510 980 A relates to a radar echo simulator which performs a two-stage frequency conversion of a radar signal of an anti-collision radar provided in a vehicle from millimeter waves to centimeter waves by means of a so-called "down conversion module" so that the radar signal is analyzed by a signal processor and an analog echo signal can thereby be generated according to a parameter input.

It is a task of the present invention to improve a radar target emulation, in particular to compress a broadband radar signal substantially without or with at least minimized degradation for processing in a radar target emulator.

This task is solved in terms of the present invention by an apparatus and a method according to the independent claims as well as a test bench having such an apparatus.

One aspect of the present invention relates to an apparatus for converting a radar signal for further signal processing, in particular in a test bench with a radar target emulator which comprises a divider assembly and a multiplier assembly. The divider assembly preferably comprises a divider device designed to reduce a frequency and a bandwidth of the radar signal by a first factor for the further signal processing. The multiplier assembly preferably comprises a multiplier device designed to increase a frequency and a bandwidth of the radar signal by the first factor subsequent the further signal processing, in particular by the radar target emulator.

This is particularly advantageous as the divider device can convert the radar signal for further signal processing, in particular for processing in a radar target emulator, without mixing with a signal component of a local oscillator, which would deteriorate the signal quality of the radar signal due to phase noise. Analogously, this is particularly advantageous as the multiplier device can convert the radar signal subsequent the further signal processing, in particular subsequent the radar target emulator processing, without mixing with a signal component of a local oscillator, in particular for transmission to a radar sensor.

Preferably both the frequency and bandwidth are thereby reduced or increased by the first factor substantially simultaneously in the divider assembly or in the multiplier assembly respectively; i.e. within the scope of a single signal processing performed on the radar signal. The reducing of the radar signal bandwidth in the divider assembly by the divider device thereby allows a compressing of the radar signal or its signal spectrum respectively, by means of which the radar signal can be compressed without loss of information. Consequently, high-bandwidth radar signals, for instance 4 GHz, compressed in such a manner can also be processed, in particular digitally, by radar target emulators at a lower bandwidth.

The reduction in frequency and in particular bandwidth by means of the divider device and similarly the increase in frequency and in particular bandwidth by means of the multiplier device is preferably realized in substantially analog or at least partly analog manner pursuant to the invention. To that end, the divider device and/or the multiplier device each advantageously comprise or are formed by an analog circuit. The signal can thus be compressed or decompressed without incident of artefacts induced by digital processing, for instance by discrete sampling, or at least loss of information.

Overall, the invention enables the improving of a radar target emulation, in particular the compressing of a broadband radar signal substantially without or with at least minimized degradation for processing in a radar target emulator.

None of the apparatus known from the prior art disclose a divider assembly with a divider device for reducing, in particular equally, the frequency and bandwidth of a radar signal by a first factor for further signal processing. Moreover, nor do any of the apparatus known from the prior art disclose providing a multiplier device in a multiplier assembly which then again increases by the first factor, in particular equally, the frequency and the bandwidth of the radar signal processed particularly in a radar target emulator, the frequency and bandwidth of which were previously reduced by the first factor.

A "test bench" within the meaning of the present invention is in particular an arrangement by means of which a radar signal emitted by a radar sensor can be received and modified in such a way that the modified radar signal contains information relative to a test scenario; i.e. particularly information relating to the position and the distance of emulated objects, and can then be provided back again to the radar sensor as thusly modified when needed. The information relative to the test scenario is for example contained in the amplitude and/or the phase of the modified radar signal. A test bench can thus for example be used to test a driver assistance system of a vehicle, wherein the radar signal from a radar sensor of the vehicle connected to the driver assistance system is supplied to the test bench, modified, and returned to the radar sensor as a modified radar signal.

A "divider assembly" within the meaning of the present invention is in particular an arrangement of at least one analog and/or digital signal processing component, in particular a divider device. By means of the at least one signal processing component, an input signal provided to the divider assembly at an input frequency, particularly in an operating frequency range of the radar sensor, and an input bandwidth converted into an operating signal at an operating frequency and operating bandwidth can be output in particular to a radar target emulator. The operating frequency is thereby reduced by one factor relative to the input frequency and the operating bandwidth is reduced by the same or a different factor relative to the input bandwidth.

A "multiplier assembly" within the meaning of the present invention is in particular an arrangement of at least one analog and/or digital signal processing component, in particular a multiplier device. By means of the at least one signal processing component, an operating signal, in particular modified by a radar target emulator, provided to the multiplier assembly at a potentially modified operating frequency and a potentially modified operating bandwidth converted into an output signal at an output frequency and an output bandwidth can be transmitted in particular to a radar sensor. The output frequency is thereby increased by one factor relative to the potentially modified operating frequency and the output bandwidth is increased by the same or a different factor relative to the potentially modified operating bandwidth.

A "divider device" within the meaning of the present invention is in particular configured to "deconvolute" one of the radar signals in the frequency domain fed to the divider device, in particular into two equally deconvoluted radar signals. Mathematically, this corresponds to extracting a root from the radar signal in the time domain, in particular extracting the square root. This thereby preferably yields a shift in the frequency of the radar signal toward lower frequencies and a reduction in the bandwidth of the radar signal.

A "multiplier device" within the meaning of the present invention is in particular configured to convolute one of the radar signals in the frequency domain fed to the multiplier device, in particular with itself. Mathematically, this corresponds to a multiplication of the radar signal in the time domain, in particular the squaring of the radar signal. Hence, the multiplier device is also referred to as a "multiplier." This thereby preferably yields a shift in the frequency of the radar signal toward higher frequencies and an increase in the bandwidth of the radar signal.

In one preferential embodiment, the divider device comprises at least one, in particular regenerative, frequency divider which is preferably designed as an electronic, at least partly analog, circuit and is further preferably configured to divide the frequency of a radar signal applied to the frequency divider in a predetermined, preferably integer or rational, division ratio which corresponds in particular to the first factor. The in particular regenerative frequency divider may also be referred to as a "Miller frequency divider" and is preferentially configured to utilize a mixer component to mix an input signal applied to the frequency divider with a potentially amplified feedback signal of said mixer component.

The bandwidth of the radar signal divided by the frequency divider is thereby divided analogously to the frequency, preferably in the predetermined, preferably integer or rational division ratio, wherein the division ratio corresponds in particular to the first factor.

The frequency and the bandwidth of the radar signal applied to the frequency divider is thereby preferably divided in the frequency domain which corresponds to extracting the root in the time/signal domain.

In a further preferential embodiment, the divider assembly further comprises a divider module configured to reduce a frequency of the radar signal, in particular the input signal applied to the divider assembly or the radar signal output by the at least one divider device, by a second factor for further signal processing, in particular for providing to the at least one divider device or the radar target emulator respectively. The multiplier assembly thereby preferably comprises a multiplier module configured to increase a frequency of the radar signal by the second factor subsequent the further signal processing, in particular the potentially modified operating signal output by the radar target emulator, in particular for providing to the at least one multiplier device or for transmission to the radar sensor.

The frequency of the radar signal, in particular of the input signal applied to the divider assembly, can thereby be shifted into a range, in particular to below a predetermined frequency limit, in which the at least one divider device can process the radar signal, in particular divide its frequency and bandwidth. The frequency of the radar signal is thereby preferably reduced to below 25 GHz, preferentially to below 15 GHz, in particular to below 10 GHz.

Furthermore, the frequency of the radar signal, preferably of the potentially modified operating signal processed by the at least one multiplier device, can thereby be adapted to the frequency of the input signal originally provided at the divider assembly so that the output signal of the multiplier assembly can be substantially transmitted to the radar sensor in a frequency operating range of the radar sensor.

As defined by the invention, a "frequency operating range" of a signal processing component, for instance the radar sensor, the radar target emulator, the divider and/or multiplier device, is in particular a frequency range in which the signal processing component can reliably and precisely process a given or respectively received signal, in particular without errors and/or artefacts. In other words, a frequency operating range of a signal processing component corresponds to the frequency range in which the signal processing component is intended to operate.

As defined by the invention, a "bandwidth operating range" of a signal processing component, for instance the radar sensor, the radar target emulator, the divider and/or multiplier device, is in particular a bandwidth range in which the signal processing component can reliably and precisely process a given or respectively received signal, in particular without errors and/or artefacts. In other words, a bandwidth operating range of a signal processing component corresponds to the bandwidth range in which the signal processing component is intended to operate.

In a further preferential embodiment, the divider module and/or the multiplier module comprises an oscillator component for generating a conversion signal at a conversion frequency and a mixer component for mixing the conversion signal with the radar signal provided at the divider module or multiplier module respectively. The mixing of the conversion signal with the radar signal results in a reliable and precise reduction or respectively increase by the second factor of the radar signal frequency of, in particular the input signal provided at the divider assembly and/or the optionally modified operating signal processed by the at least one multiplier device which is in particular adaptable to the frequency operating range of the divider device or the radar sensor respectively.

In a further preferential embodiment, the first factor is in the range of 1 to 10, preferably in the range of 1.5 to 6, in particular in the range of 2 to 4. A radar signal emitted by the radar sensor at a frequency operating range above 60 GHz and a bandwidth operating range between 10 MHz and 20 GHz, preferably between 100 MHz and 10 GHz, in particular between 250 MHz and 5 GHz, which is preferably provided as an input signal at the divider assembly at a corresponding frequency and bandwidth, can thereby be reliably processed by the radar target emulator as an operating signal at a frequency/bandwidth reduced by comparison or respectively subsequently transmitted to the radar sensor at a frequency within its frequency operating range and a bandwidth within its bandwidth operating range.

A second aspect of the invention relates to a test bench for processing a radar signal which comprises an apparatus for converting the radar signal according to the first aspect of the invention and a radar target emulator, wherein the radar target emulator is interconnected with the divider assembly and the multiplier assembly; i.e. connected so as to carry signals, and is configured to process, in particular apply a Doppler shift, delay and/or modulate, the radar signal provided by the divider assembly, the frequency and bandwidth of which being reduced by the divider assembly by at least the first factor, such that a correspondingly processed radar signal characterizes at least one emulated object.

This is particularly advantageous since the combination of an apparatus according to the invention for converting a radar signal together with the downstream radar target emulator enables the precise and reliable processing of radar signals from the radar target emulator transmitted at high frequencies, for instance above 60 GHz, and wide bandwidths, for instance above 250 MHz, by a radar sensor at a high spatial and temporal resolution, even when such high frequencies and such wide bandwidths cannot be processed or can only be inadequately processed by conventional radar target emulators. The test bench resulting from this combination thus also enables using conventional radar target emulators which are of technically uncomplicated design and fitted with economical electronic components in conjunction with special and/or particularly high-performance radar sensors, in particular those operating in unusual frequency and/or bandwidth ranges. In other words, just by making slight adjustments to the divider assembly and the multiplier assembly, or the signal processing components contained therein respectively, in particular the divider device and the multiplier device, and/or the divider module and the multiplier module, the inventive test bench can be adapted to various radar systems having different frequency operating ranges and/or bandwidth operating ranges as used in different vehicles.

In a further preferential embodiment, the radar target emulator is configured to process the radar signal provided by the divider assembly, the frequency of which is less than 10 GHz, preferably less than 5 GHz, in particular less than 2.5 GHz, and the bandwidth of which is less than 4 GHz, preferably less than 2 GHz, in particular less than 1 GHz. In other words, the radar target emulator preferably has an operating frequency range at below 10 GHz and an operating bandwidth range at below 2 GHz. The radar signal, in particular the operating signal, can consequently be reliably processed.

A third aspect of the invention relates to a method for converting a radar signal for further processing in a test bench with a radar target emulator, wherein a frequency and a bandwidth of the radar signal is reduced by a first factor for further signal processing, and wherein a frequency and a bandwidth of the radar signal is increased by the first factor subsequent the further signal processing.

The features and advantages described with respect to the first aspect of the invention and advantageous embodiment thereof also apply to the second and third aspects of the invention and advantageous embodiment thereof and vice versa.

Figure 2:
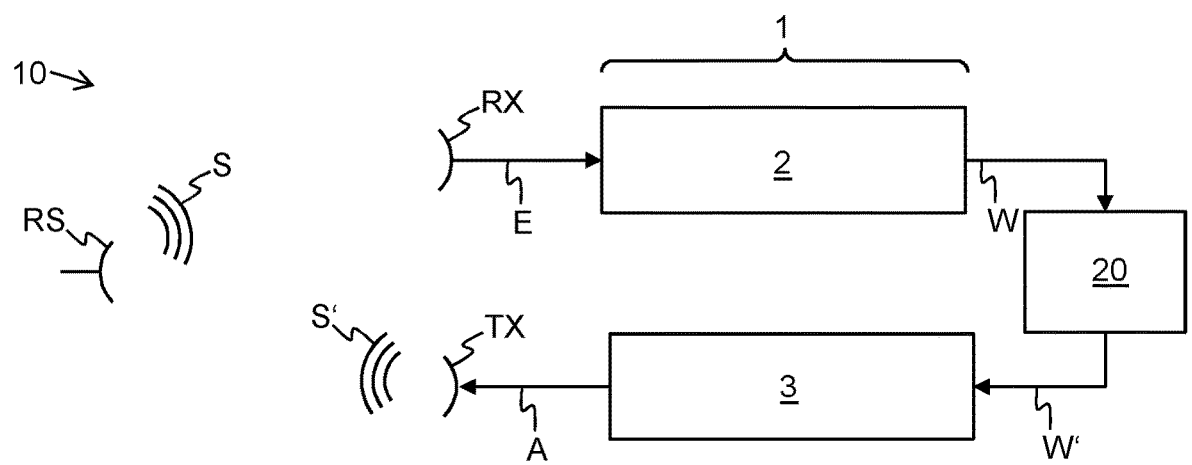

The invention is explained in greater detail below on the basis of non-limiting exemplary embodiments as depicted in the figures. Shown therein at least partially schematically:

FIG. 1 a circuit diagram of an apparatus for converting a radar signal according to one preferential embodiment of the present invention; and FIG. 2 a circuit diagram of a test bench according to one preferential embodiment of the present invention.

FIG. 1 depicts a circuit diagram of an apparatus 1 for converting a radar signal for further signal processing, in particular in a test bench having a radar target emulator, in one preferential embodiment of the present invention. The apparatus 1 comprises a divider assembly 2 and a multiplier assembly 3, each of which preferably having a plurality of signal processing components 4, 4', 5, 5' arranged one behind the other in the direction of signal flow and interconnected; i.e. connected together in signal-conducting manner. The divider assembly 2 is thereby preferentially configured to receive a radar signal provided at the divider assembly 2, and thus also referred to as input signal E, and output it again as a radar signal, in particular operating signal W, at a reduced frequency or bandwidth respectively compared to a frequency and bandwidth of the input signal E. The operating signal W output as such can then, after the further signal processing, which is indicated by the dashed line, be received by the multiplier assembly 3 as a processed or respectively modified operating signal W and output again as a radar signal, in particular output signal A, at a higher frequency and bandwidth compared to the frequency and bandwidth of the modified operating signal W.

Thereby preferably provided within the divider assembly 2 is a divider device 4 which is configured to convert the radar signal applied to the divider device 4, in particular an intermediate signal Z, into the operating signal W so that the frequency and the bandwidth of the operating signal W is reduced by a first factor compared to the frequency or bandwidth respectively of the intermediate signal applied to the divider device 4. In other words, the divider device 4 is preferentially configured to compress the bandwidth of the radar signal applied to the divider device 4 as the intermediate signal Z so that the radar signal output from the divider device 4 as operating signal W has a bandwidth reduced by the first factor compared to the bandwidth of the input signal E.

The divider device 4 can thereby be designed as a regenerative frequency divider comprising a mixer component 4a for mixing the intermediate signal Z applied to the frequency divider with a feedback signal R, a filter component 4b, in particular a low-pass filter, for filtering out one or more frequency ranges from the mixed signal output from the mixer component 4a, and an amplifier component 4c for amplifying the filtered signal output from the filter component 4b. During the operation of the frequency divider, a part of the signal output by the mixer component 4a, in particular after being run through the filter component 4b and the amplifier component 4c, is fed back to the mixer component 4a again as a feedback signal R. Frequency components, in particular integer frequency fractions, can thereby be selectively isolated and amplified so that the operating signal W output by the frequency divider during the operation of the frequency divider has a frequency reduced by the first factor and a bandwidth reduced by the first factor relative to the intermediate signal Z applied to the frequency divider.

When the divider device 4 is designed as an analog circuit in the described preferential manner, there is no loss of information upon compressing the bandwidth of the intermediate signal Z.

Since the filter component 4b of the divider device 4 usually only functions reliably in a selected frequency range, for example filters all the frequency components of the signal supplied to it above a predetermined frequency threshold, for instance above 10 GHz, it may be necessary to convert the frequency of the input signal E into a frequency that lies within the selected frequency range of the filter component 4b. In other words, the input signal E might potentially need to be prepared for processing in the divider device 4, in particular converted into the intermediate signal Z at a reduced frequency.

To that end, the present example provides for a divider module 5 within the divider assembly 2 which is configured to reduce the frequency of the input signal E by a second factor such that the frequency of the resulting radar signal output by the divider module 5, also referred to as intermediate signal Z, lies within the frequency operating range of the divider device 4; i.e. the intermediate signal Z can be reliably and precisely processed by the divider device 4.

The divider module 5 preferably comprises a mixer component 5a for mixing the input signal E applied to divider module 5 with a conversion signal K and an oscillator component 5b for generating the conversion signal K. If necessary, the divider module 5 can also comprise a filter component and an amplifier component (not shown) via which the mixed signal output by the mixer component 5a can be post-processed, in particular so that the frequency of the intermediate signal Z is reduced by the second factor compared to the frequency of the input signal E. Mixing the input signal E with the conversion signal K only influences the frequency of the input signal E but not its bandwidth.

All in all, the frequency of the radar signal provided as input signal E can thus be reduced within the divider assembly 2 by a factor which results from multiplying the first factor by the second factor. The change in frequency thus rendered can also be referred to as "frequency conversion."

The bandwidth change thereby rendered within the divider assembly 2, in which the radar signal bandwidth is reduced by the second factor, can also be referred to as "bandwidth compression."

The multiplier assembly 3 is similar in structure to the divider assembly 2. In particular, the multiplier assembly 3 can respectively comprise signal processing components 4', 5' corresponding to signal processing components 4, 5 of the divider assembly 2 albeit oppositely acting. Instead of the divider device 4, the multiplier assembly 3 can for instance comprise a multiplier device 4' which is preferably configured to convert the modified operating signal W applied to the multiplier device 4' into a further intermediate signal Z', its frequency and bandwidth increased by the first factor relative to the frequency or bandwidth respectively of the modified operating signal W. Furthermore, instead of the divider component 5, the multiplier assembly 3 preferably comprises a multiplier component 5' which is preferentially configured to convert the further intermediate signal Z' applied to the multiplier component 5' into output signal A, the frequency of which is increased by the second factor relative to the frequency of the further intermediate signal Z'.

The multiplier device 4' is thereby preferably designed as a multiplier, in particular an analog multiplier.

Analogous to divider component 5, the multiplier component 5' preferentially comprises a mixer component 5a for mixing the further intermediate signal Z' with a conversion signal K generated by an oscillator component 5b of the divider component 5. When the further intermediate signal Z' is mixed with the conversion signal K, however, the frequency of the further intermediate signal Z' is increased by the second factor to the frequency of output signal A.

The signal processing components 4, 4', 5, 5' in the divider assembly 2 and the multiplier assembly 3 are preferably synchronized such that the frequency and bandwidth of the output signal A substantially correspond to the frequency or bandwidth respectively of the input signal E. In particular, the multiplier assembly 3, in particular the multiplier device 4' and the multiplier module 5', can be configured to substantially reverse or respectively offset the change in frequency effected within the divider assembly 2 on the radar signal provided as input signal E and the change in bandwidth effected on the radar signal provided subsequent the further signal processing, for instance in a radar target emulator, in particular on the processed or respectively modified radar signal provided as operating signal W.

Even though the present example shows and describes only one respective divider device 4, multiplier device 4', divider module 5 and multiplier module 5', it is in principle possible for a plurality of these signal processing components 4, 4', 5, 5' to be provided in the divider assembly 2 or the multiplier assembly 3 respectively. This is in particular advantageous when, for example, a single divider module 5 is incapable of reducing the frequency of the input signal E to the frequency of the intermediate signal Z for processing by the divider device 4 and/or a single divider device 4 is incapable of reducing the bandwidth of the input signal E to the bandwidth of the operating signal A for further signal processing, for example by a radar target emulator. By combining a plurality of signal processing components 4, 4', 5, 5', the functionality of the apparatus 1 can be adapted to the requirements of the radar target emulator or the individual signal processing components 4, 4', 5, 5' respectively.

The order in which the signal processing components 4, 4', 5, 5' process the radar signal is thereby irrelevant, as long as the frequency and/or the bandwidth of the signal applied to the signal processing components 4, 4', 5, 5' is/are in the frequency/bandwidth operating range of the respective component.

It is particularly also advantageously possible to design one or more divider modules 5 and one or more multiplier modules 5 such that the respective mixer components 5a mix their given radar signal with a conversion signal K of one or more common oscillator components 5b. In particular, for each divider module 5 in which the frequency of the applied radar signal is reduced by one, in particular the second, factor based on the conversion signal K provided by the oscillator component 5b, a multiplier module 5 can thus be provided in which the frequency of the applied radar signal is increased by the same, in particular the second, factor based on the same conversion signal K provided by the same oscillator component 5b. In other words, at least one divider module 5 and at least one multiplier module 5' can be configured to share an oscillator component 5b. The frequency of the radar signal processed in the multiplier assembly 3 can thereby be reliably increased to the same degree as the radar signal processed in the divider assembly 2 was previously reduced.

FIG. 2 shows the circuit diagram of a test bench 10 with an apparatus 1 for converting a radar signal S for further signal processing in a radar target emulator 20 according to a preferential embodiment of the present invention. The test bench 10 comprises a receiver device RX for receiving a radar signal S emitted by a radar sensor RS, for example installed in a motor vehicle, and a transmitter device TX for transmitting the processed radar signal S' back to the radar sensor RS. The radar sensor RS thereby exhibits a frequency operating range and a bandwidth operating range within which it can transmit/receive radar signals S, S'.

The radar target emulator 20 is preferably configured to emulate a test scenario; i.e. emulate one or more radar targets, in particular a traffic situation, and process, in particular apply a Doppler shift, delay and/or modulate, an applied operating signal W such that the processed operating signal W output by the radar target emulator 20, occasionally also referred to as a modified operating signal, contains information relative to the emulated test scenario. The radar target emulator 20 thereby operates in a different frequency operating range or bandwidth operating range respectively from the frequency operating range and bandwidth operating range of the radar sensor RS such that the radar signal S received by the receiver device RX needs to be converted into the operating signal W.

To that end, the apparatus 1 is interposed between the receiver device RX and the radar target emulator 20 and comprises a divider assembly 2, by means of which the radar signal S provided at the divider assembly 2 as input signal E can be converted into the operating signal W. As described in conjunction with FIG. 1, a frequency conversion and a bandwidth compression are thereby effected, with the frequency of the input signal E being reduced by a factor resulting from multiplying a first factor by a second factor or, respectively, the bandwidth of the input signal E being reduced by the first factor.

In order to be able to transmit the operating signal W processed and output from the radar target emulator 20 back to the radar sensor S, a reverse conversion of the processed and output operating signal W' into an output signal A is accordingly necessary. By means of a multiplier assembly 3 of the apparatus 1, which is interposed between the radar target emulator 10 and the transmitter device TX, the frequency and bandwidth of the processed and output operating signal W reduced in the course of the frequency conversion and bandwidth compression can be increased again so as to substantially correspond to the frequency/bandwidth of the radar signal S originally transmitted by the radar sensor RS. The transmitter device TX can then transmit the output signal A back to the radar sensor RS as processed radar signal S' and the information contained therein relating to the emulated test scenario, for example from a driver assistance system or a vehicle function of the vehicle having the radar sensor RS respectively, can be used to test the driver assistance system/vehicle function.

LIST OF REFERENCE NUMERALS 1 apparatus for converting a radar signal
2 divider assembly
3 multiplier assembly
4 divider device
4a mixer component
4b filter component
4c amplifier component
4' multiplier device
5 divider module
5a mixer component
5b oscillator component
5' multiplier module
10 test bench
20 radar target emulator
E input signal
A output signal
Z intermediate signal
Z' further intermediate signal
W operating signal
W' processed operating signal
S radar signal
S' processed radar signal
K conversion signal
RS radar sensor
RX receiver unit
TX transmitter unit

What is claimed is:

1. An apparatus for converting a radar signal for further signal processing in a test bench with a radar target emulator, comprising:
　　a divider assembly having a divider device configured to reduce a frequency and a bandwidth of the radar signal by a first factor such that the radar signal has a reduced frequency and a reduced bandwidth for the further signal processing; and
　　a multiplier assembly having a multiplier device configured to increase the reduced frequency and the reduced bandwidth of the radar signal by the first factor subsequent the further signal processing.

2. The apparatus according to claim 1, wherein the divider device comprises at least one frequency divider.

3. The apparatus according to claim 1, wherein the divider assembly further comprises a divider module configured to reduce a frequency of the radar signal by a second factor for the further signal processing such that the radar signal has a second reduced frequency, and wherein the multiplier assembly further comprises a multiplier module configured to increase the second reduced frequency of the radar signal by the second factor subsequent the further signal processing.

4. The apparatus according to claim 1, wherein the divider module and/or the multiplier module comprises an oscillator component configured to generate a conversion signal at a conversion frequency and a mixer component configured to mix the conversion signal with the radar signal provided at the divider module or the multiplier module respectively.

5. The apparatus according to claim 1, wherein the first factor is in the range of 1 to 10.

6. A test bench configured to process a radar signal, comprising:

an apparatus for converting the radar signal according to claim 1; and a radar target emulator which is interconnected to the divider assembly and the multiplier assembly and is configured to process, delay, and/or modulate the radar signal provided by the divider assembly, the frequency and the bandwidth of the radar signal being reduced by the divider assembly by at least the first factor such that a correspondingly processed radar signal characterizes at least one emulated object.

7. The test bench according to claim 6, wherein the radar target emulator is configured to process the radar signal provided by the divider assembly, the reduced frequency of the radar signal is less than 10 GHz, and the reduced bandwidth of the radar signal is less than 4 GHz.

8. A method for converting a radar signal for further signal processing in a test bench with a radar target emulator, comprising:

reducing a frequency and a bandwidth of the radar signal by a first factor such that the radar signal has a reduced frequency and a reduced bandwidth for the further signal processing; and increasing the reduced frequency and the reduced bandwidth of the radar signal by the first factor subsequent the further signal processing.

9. A method for converting a radar signal for further signal processing in a test bench with a radar target emulator, comprising:

reducing a frequency and a bandwidth of the radar signal by a first factor via a divider assembly having a divider device such that the radar signal has a reduced frequency and a reduced bandwidth for the further signal processing; and increasing the reduced frequency and the reduced bandwidth of the radar signal by the first factor via a multiplier assembly having a multiplier device subsequent the further signal processing.

* * * * *